United States Patent
Kim et al.

(10) Patent No.: US 9,584,206 B2
(45) Date of Patent: Feb. 28, 2017

(54) METHOD AND APPARATUS FOR OPERATING A NON-ORTHOGONAL MULTIPLE ACCESS SCHEME IN MULTIUSER BEAMFORMING SYSTEM

(71) Applicants: Samsung Electronics Co., Ltd., Suwon-si, Gyeonggi-do (KR); Industry-Academic Cooperation Foundation, Yonsei University, Seoul (KR)

(72) Inventors: Beomju Kim, Seoul (KR); Sang-Wook Suh, Yongin-si (KR); Daesik Hong, Seoul (KR); Sung-Mook Lim, Seoul (KR); Hyung-Jong Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 208 days.

(21) Appl. No.: 14/257,414

(22) Filed: Apr. 21, 2014

(65) Prior Publication Data

US 2014/0314006 A1    Oct. 23, 2014

(30) Foreign Application Priority Data

Apr. 19, 2013    (KR) ........................ 10-2013-0043712

(51) Int. Cl.
H04B 7/06    (2006.01)
H04B 7/04    (2006.01)

(52) U.S. Cl.
CPC ......... *H04B 7/0626* (2013.01); *H04B 7/0452* (2013.01)

(58) Field of Classification Search
CPC .......................... H04B 7/0626; H04B 7/0452
See application file for complete search history.

(56) References Cited

U.S. PATENT DOCUMENTS

| | | | |
|---|---|---|---|
| 2010/0165914 A1 | 7/2010 | Cho et al. | |
| 2010/0329369 A1* | 12/2010 | Hou | H04B 7/0452 375/260 |
| 2012/0082198 A1* | 4/2012 | Zhang | H04B 7/0617 375/224 |
| 2012/0315938 A1* | 12/2012 | Van Nee | H04B 7/0434 455/507 |

(Continued)

*Primary Examiner* — Paul H Masur
*Assistant Examiner* — Kabir Jahangir
(74) *Attorney, Agent, or Firm* — Jefferson IP Law, LLP

(57) ABSTRACT

A frequency-efficient antenna operation method is provided in a multiuser beamforming system. The method includes determining channel correlations and channel gain differences between channels using channel information received from multiple terminals, classifying the multiple terminals into at least one or more clusters using the channel correlations and channel gain differences, selecting a beamforming vector for each of the one or more clusters using the channel information of at least one or more terminals in the one or more clusters, allocating power to the terminals in each of the one or more clusters, and forming a beam based on the allocated power and the selected beamforming vector. According to the method, interference due to sharing space resources may be reduced and more efficient data communication may be achieved.

22 Claims, 13 Drawing Sheets

(56) References Cited

U.S. PATENT DOCUMENTS

| | | | |
|---|---|---|---|
| 2014/0294107 A1* | 10/2014 | Shin | H04B 7/0456 375/267 |
| 2015/0003370 A1* | 1/2015 | Yokomakura | H04W 52/24 370/329 |
| 2015/0358064 A1* | 12/2015 | Benjebbour | H04B 7/0452 370/329 |
| 2016/0014785 A1* | 1/2016 | Benjebbour | H04W 52/143 370/329 |

* cited by examiner

|  | $h_1$ | $h_2$ | $h_3$ | ... | $h_{K-1}$ | $h_K$ |
|---|---|---|---|---|---|---|
| $h_1$ | 1 | 67.5 | 52.7 | ... | 13.2 | |
| $h_2$ | | 1 | 103.4 | ... | | 45.1 |
| $h_3$ | | | 1 | ... | 23.7 | |
| ⋮ | | | | | | ... |
| $h_K$ | | | | | | 1 |

METHOD AND APPARATUS FOR OPERATING A NON-ORTHOGONAL MULTIPLE ACCESS SCHEME IN MULTIUSER BEAMFORMING SYSTEM

CROSS-REFERENCE TO RELATED APPLICATION(S)

This application claims the benefit under 35 U.S.C. §119(a) of a Korean patent application filed on Apr. 19, 2013 in the Korean Intellectual Property Office and assigned Serial No. 10-2013-0043712, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD, and 2) Industry-Academic Cooperation Foundation, Yonsei University.

TECHNICAL FIELD

The present disclosure relates to a method and apparatus for operating a Non-Orthogonal Multiple Access (NOMA) scheme in a multiuser beamforming system.

BACKGROUND

A multiuser beamforming system supports multiple users by using a beamforming scheme in a multi antenna environment. The Beamforming scheme in a multi antenna environment may be largely divided into Orthogonal Multiple Access (OMA) based beamforming and Non-Orthogonal Multiple Access (NOMA) based beamforming.

OMA based beamforming (or OMA beamforming) supports a number of users that is less than the number of antennas of a transmitting end. The OMA beamforming shares space resources per user. In other words, the OMA beamforming supports only one user per beam. Accordingly, if a zero-forcing beamforming scheme is used, there is no inter-user interference. In this case, however, the number of users to be supported concurrently (e.g., the number of concurrent users) is limited by the number of antennas of the transmitting end, thus restricting the improvement of communication capacity (or sum capacity).

NOMA based beamforming (or NOMA beamforming) supports a number of users that is more than the number of antennas of the transmitting end. The NOMA beamforming generates beams more than the number of antennas of the transmitting end, thus increasing the number of concurrent users. However, because inter-beam orthogonality is not sustained, performance degradation of the communication capacity occurs, and in this regard, as the number of concurrent users increases, the performance degradation of communication capacity gets worse. Accordingly, the NOMA beamforming rather lags far behind in the communication capacity to the OMA beamforming. Therefore, a need exists for a technology to cancel or minimize inter-beam interference to overcome performance degradation of communication capacity that may occur when such a NOMA based beamforming scheme is used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for minimizing interference among user terminals in a beamforming system.

Another aspect of the present disclosure is to provide an interference cancellation method and apparatus for minimizing interference among user terminals in a beamforming system that supports terminals more than the number of antennas of a transmitting end.

In accordance with an aspect of the present disclosure, a method for operating a Non-Orthogonal Multiple Access (NOMA) scheme of a Base Station (BS) in a multiuser beamforming system is provided. The method includes determining channel correlations and channel gain differences between channels using channel information received from multiple terminals, classifying the multiple terminals into at least one or more clusters using the channel correlations and channel gain differences, selecting a beamforming vector for each of the one or more clusters using the channel information of at least one or more terminals in the one or more clusters, allocating power to the terminals in each of the one or more clusters, and forming a beam based on the allocated power and the selected beamforming vector.

In accordance with another aspect of the present disclosure, an apparatus for operating a Non-Orthogonal Multiple Access (NOMA) scheme of a Base Station (BS) in a multiuser beamforming system is provided. The apparatus includes a communication unit configured to convert channel information received from multiple receiver devices through antennas to processable information, and a controller configured to generate power allocation ratios and beamforming vectors for the receiver devices based on the channel information delivered through the communication unit, wherein the controller is configured to determine channel correlations and channel gain differences between channels using channel information received from multiple terminals, classify the multiple terminals into at least one or more clusters using the channel correlations and channel gain differences, select a beamforming vector for each of the one or more clusters using the channel information of at least one or more terminals in the one or more clusters; allocate power to the terminals in each of the one or more clusters, and form a beam based on the allocated power and the selected beamforming vector.

In accordance with another aspect of the present disclosure, a method for operating a Non-Orthogonal Multiple Access (NOMA) scheme of a terminal in a multiuser beamforming system is provided. The method includes receiving a user signal and indicator from a Base Station (BS), determining from the indicator whether Non Orthogonal Multiple Access (NOMA) is used for transmission or Orthogonal Multiple Access (OMA) is used for transmission, and performing Soft Interference Cancellation (SIC) if NOMA is used for transmission, wherein the user signal is generated by the BS determining channel correlations and channel gain differences between channels using channel information received from multiple terminals, classifying the multiple terminals into at least one or more clusters using the channel correlations and channel gain differences, selecting a beamforming vector for each of the one or more clusters using the channel information of at least one or more terminals in the one or more clusters, allocating power to the terminals in each of the one or more clusters, and forming a beam based on the allocated power and the selected beamforming vector.

In accordance with another aspect of the present disclosure, an apparatus for operating a Non-Orthogonal Multiple Access (NOMA) scheme of a terminal in a multiuser beamforming system is provided. The apparatus includes a receiver configured to receive a user signal and indicator from a Base Station (BS), and a controller configured to determine from the indicator whether Non Orthogonal Multiple Access (NOMA) is used for transmission or Orthogonal Multiple Access (OMA) is used for transmission, and perform Soft Interference Cancellation (SIC) if it NOMA is used for transmission, wherein the user signal is generated by the BS determining channel correlations and channel gain differences between channels using channel information received from multiple terminals, classifying the multiple terminals into at least one or more clusters using the channel correlations and channel gain differences, selecting a beamforming vector for each of the one or more clusters using the channel information of at least one or more terminals in the one or more clusters, allocating power to the terminals in each of the one or more clusters, and forming a beam based on the allocated power and the selected beamforming vector.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
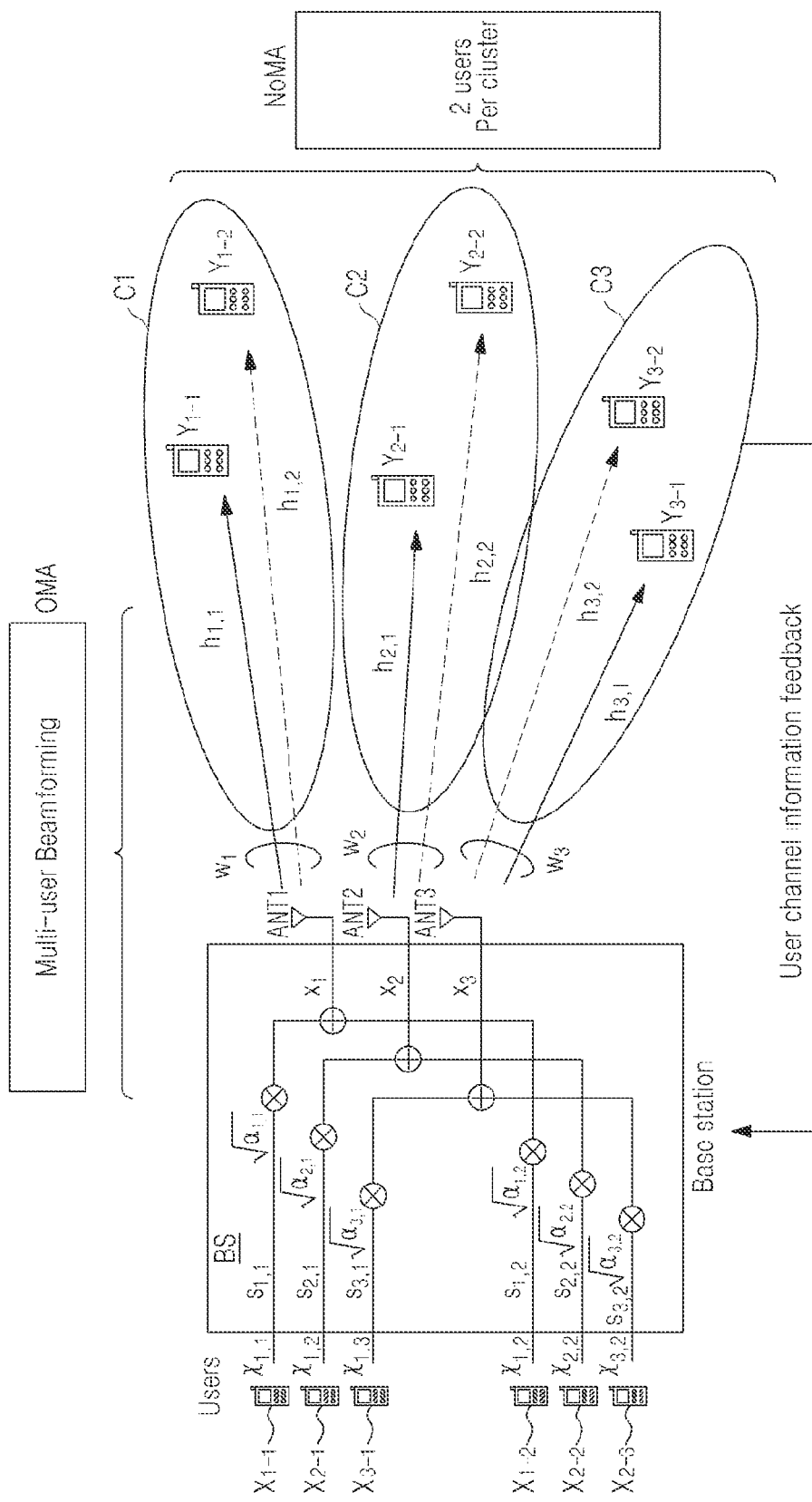
FIG. 1 is a schematic block diagram of a beamforming system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a user may correspond to an electronic device.

Various embodiments of the present disclosure provide a method for reducing performance degradation that may occur in a Non-Orthogonal Multiple Access (NOMA) beamforming system that supports a number of users that is greater than the number of antennas of a transmitting end and for improving communication capacity.

According to various embodiments of the present disclosure, a clustering scheme for clustering users into twos or threes (e.g., groups of two users or three users) and a scheme for allocating power for users in the cluster are proposed to improve communication capacity using channel information of users (terminals or receiver devices).

According to various embodiments of the present disclosure, a Channel Quality Indicator (CQI) based clustering and correlation based clustering are suggested as a clustering scheme for clustering users.

Various embodiments of the present disclosure will now be described with reference to accompanying drawings. In the following description, as a term 'receiving end', 'user', 'terminal', and 'receiver device' may be interchangeably used and interpreted, unless otherwise stated, as having the same meaning.

FIG. 1 is a schematic block diagram of a beamforming system, according to an embodiment of the present disclosure.

Referring to FIG. 1, the beamforming system may include a Base Station (BS) and multiple terminals $Y_{1,1}$, $Y_{1,2}$, $Y_{2,1}$, $Y_{2,2}$, $Y_{3,1}$, and $Y_{3,2}$ more than the number of antennas of the BS, and each terminal is assumed to have a single antenna.

According the various embodiments of the present disclosure illustrated in FIG. 1, assume that the number of antennas Mt of the BS is three and the number of terminals in a cell is six. The six terminals $Y_{1,1}$, $Y_{1,2}$, $Y_{2,1}$, $Y_{2,2}$, $Y_{3,1}$, and $Y_{3,2}$ are classified into three clusters C1, C2, and C3, each of which has two terminals. However, it will be appreciated that in other embodiments of the present disclosure, there may be different number of clusters and different number of terminals per cluster.

The BS may receive multiple transmission signals $\chi_{1,1}$, $\chi_{2,1}$, $\chi_{3,1}$, $\chi_{1,2}$, $\chi_{2,2}$, $\chi_{3,2}$ from multiple transmitter terminals $X_{1-1}$, $X_{2-1}$, $X_{3-1}$, . . . , $X_{1-2}$, $X_{2-2}$, $X_{3-2}$. The BS may divide the transmitter terminals $X_{1-1}$, $X_{2-1}$, $X_{3-1}$, . . . , $X_{1-2}$, $X_{2-2}$, $X_{3-2}$ into pairs and allocate power to two transmitter terminals in each pair.

The BS may generate a cluster signal $x_i$ (i=1, 2, 3 in this embodiment) by summing transmission signals of two transmitter terminals allocated power. For example, if transmission terminals $X_{1-1}$ and $X_{1-2}$ are paired, a transmission signal $\chi_{1,1}$ from the transmitter terminal $X_{1-1}$ and a transmission signal $\chi_{1,2}$ from the transmitter terminal $X_{1-2}$ may be multiplied by predefined weights $\sqrt{\alpha_{1,1}}$, $\sqrt{\alpha_{1,2}}$, respectively, and allocated power.

Then, the BS may generate a first cluster signal $x_1$ by summing the two transmission signals allocated power. If transmission terminals $X_{2-1}$ and $X_{2-2}$ are paired, a transmission signal $\chi_{2,1}$ from the transmitter terminal $X_{2-1}$ and a transmission signal $\chi_{2,2}$ from the transmitter terminal $X_{2-2}$ may be multiplied by predefined weights $\sqrt{\alpha_{2,1}}$, $\sqrt{\alpha_{2,2}}$, respectively, and allocated power, which may then be summed together to generate a second cluster signal $x_2$.

In the similar manner, a third cluster signal $x_3$ may be generated by the BS. The three cluster signals $x_1$, $x_2$, and $x_3$ may be each multiplied by a corresponding beamforming vector $w_i$ (i=1, 2, and 3) and then sent to terminals in a corresponding cluster through a corresponding one of three antennas ANT1, ANT2, and ANT3.

The terminals in the cluster may receive the cluster signal on their respective channels $h_{i,j}$. For example, the first cluster signal multiplied by a beamforming vector $w_1$ (e.g., $w_1 \cdot x_1$) is sent to terminals $Y_{1-1}$ and $Y_{1-2}$ in a first cluster CL1 on first channels $h_{1,1}$ and $h_{1,2}$; the second cluster signal multiplied by a beamforming vector $w_2$ (e.g., $w_2 \cdot x_2$) is sent to terminals $Y_{2-1}$ and $Y_{2-2}$ in a second cluster CL2 on second channels $h_{2,1}$ and $h_{2,2}$; and the third cluster signal multiplied by a beamforming vector $w_3$ (e.g., $w_3 \cdot x_3$) is sent to terminals $Y_{3-1}$ and $Y_{3-2}$ in a third cluster CL3 on third channels $h_{3,1}$ and $h_{3,2}$.

A beamforming vector for a cluster may be generated using a channel of a terminal near the BS in the cluster. In other words, for a terminal near the BS in a cluster, the terminal is given a beamforming vector fit for the terminal and performs Soft Interference Cancellation (SIC). Accordingly, inter-beam interference and inter-user interference around the terminal are canceled completely. In contrast, for a terminal far from the BS in the same cluster, the terminal is given the beamforming vector which may not be perfectly fit for the terminal and does not perform SIC, thereby being subject to both the inter-beam interference and inter-user interference. As a result, clustering of users and use of a power allocation scheme may minimize those two interferences.

Accordingly, various embodiments of the present disclosure provide a clustering algorithm for determining terminal pairs to be supported by beams using channel information of users and a power allocation method for allocating power for terminals in the cluster. For the clustering algorithm for determining terminal pairs, "inter-channel correlation and gain difference between channels" of terminals are factored in.

In the following description, a correlation based clustering method and a CQI based clustering method taking into account the two factors, inter-channel correlation and gain difference between channels, respectively, are proposed.

Figure 2:
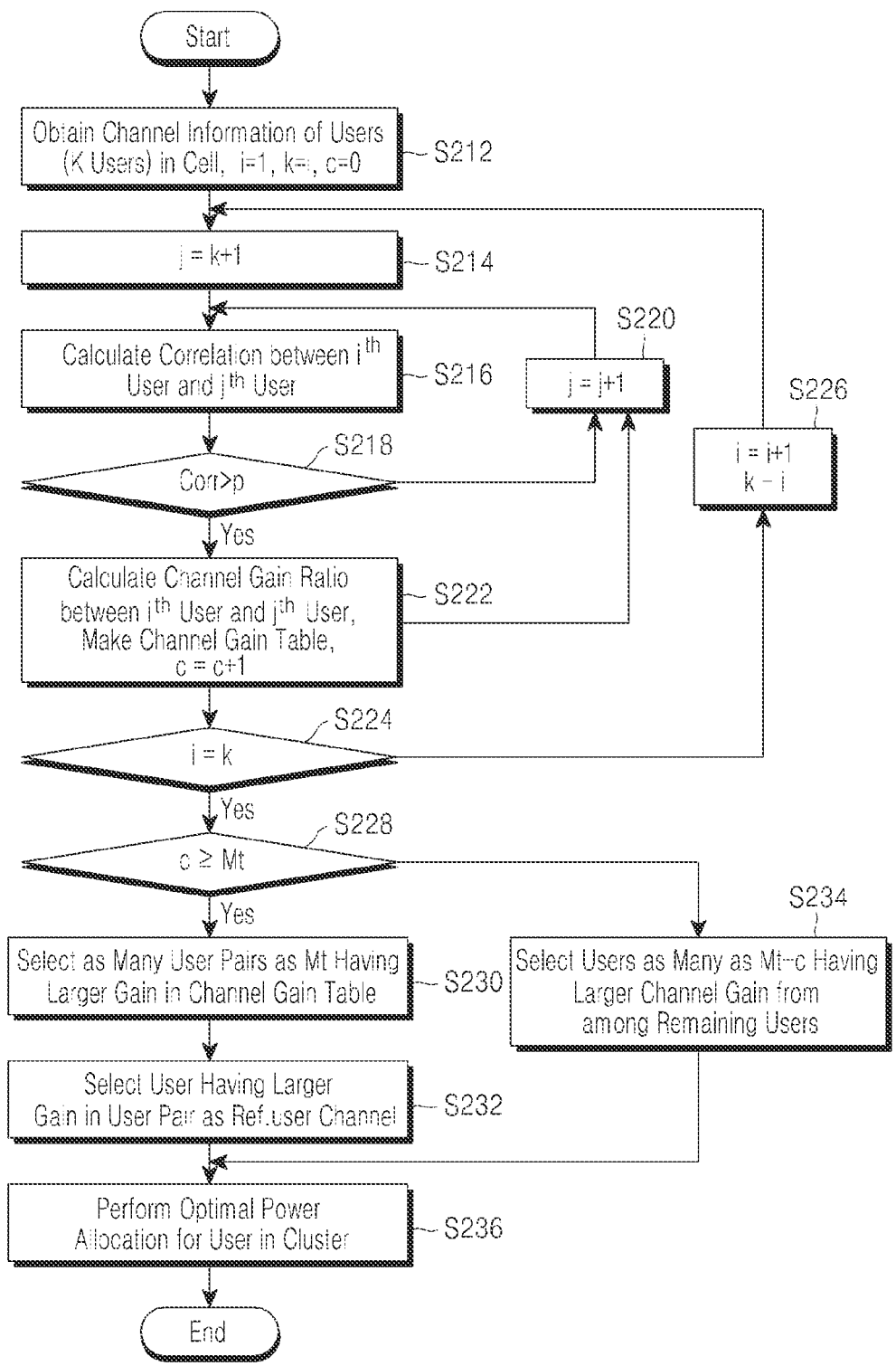
FIG. 2 is a flowchart illustrating a correlation based clustering method according to an embodiment of the present disclosure.
Figures 3, 4:
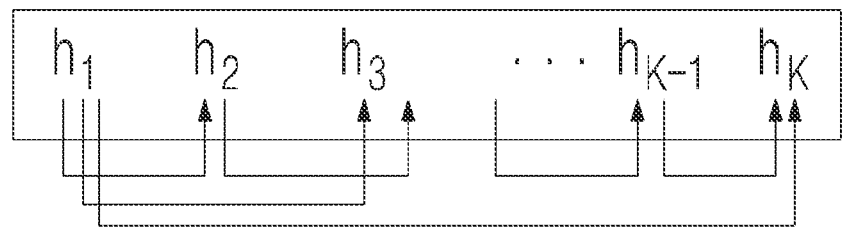
FIG. 3 illustrates selecting terminal pairs to calculate correlations according to an embodiment of the present disclosure.
FIG. 4 is an example of a channel gain table such as, for example, the chain gain table generated at operation S222 of FIG. 2 according to an embodiment of the present disclosure.

FIG. 2 is a flowchart illustrating a correlation based clustering method, according to an embodiment of the present disclosure. FIG. 3 illustrates selecting terminal pairs to calculate correlations according to an embodiment of the present disclosure.

Referring to FIG. 2, the correlation based clustering method includes taking inter-channel correlation into account to classify terminal pairs, and setting up terminal pairs having larger channel gain difference as clusters to minimize inter-beam interference.

Specifically, in operation S212, a BS may obtain respective channel information $h_1$, $h_2$, $h_3$, . . . , $h_{k-1}$, and $h_k$ of terminals (e.g., k terminals) in a cell through feedback.

In operation S214, counter j may be incremented such that j=k+1.

In operation S216, a channel $h_i$ of an $i^{th}$ terminal and a channel $h_j$ of $j^{th}$ terminal may be selected and channel correlation Corr between the channels $h_i$ and $h_j$ is calculated. In FIG. 2, it is illustrated that channels $h_i$ and $h_j$ of $i^{th}$ and $j^{th}$ terminals may be selected from among the respective channel information $h_1$, $h_2$, $h_3$, . . . $h_{k-1}$, and $h_k$ obtained in operation S212 to calculate the channel correlation Corr. The channel correlation Corr between the channels $h_i$ and $h_j$ may be calculated as in Equation (1).

$$\text{Corr} = \frac{|h_i \cdot h_j|}{|h_i||h_j|} \quad \text{Equation (1)}$$

In operation S218, the channel correlation Corr calculated in operation S216 may be compared with a predetermined correlation threshold ρ.

If Corr>ρ in operation S218, in operation S222, a channel gain ratio or channel gain difference between the channel $h_i$ of the $i^{th}$ terminal and the channel $h_j$ of the $j^{th}$ terminal may be calculated.

FIG. 4 is an example of a channel gain table such as, for example, the chain gain table generated at operation S222 of FIG. 2 according to an embodiment of the present disclosure.

If Corr≤ρ in operation S218, in operation S220, all terminal pairs in the cell are selected in a way of sequentially selecting terminals j+1 after terminal j based on the channel $h_i$ of the $i^{th}$ terminal, as shown in FIG. 3, and channel gain ratios or channel gain differences between all the sequentially selected terminal pairs may be calculated.

The calculation results may constitute a channel gain table as shown in FIG. 4. The channel gain table represents channel gain ratios or channel gain differences between terminals in rows and columns.

In operation S224 and S226, a series of operations S214 to S222 may be repeatedly performed for all the terminals (e.g., k terminals) in the cell. For example, operations S214 to S222 are repeatedly performed for $i^{th}$ terminal until i=k. With the repetitive processes, the channel gain table may be completed as shown in FIG. 4.

In operation S228, the number of terminal pairs c to be determined as clusters may be compared with the number of antennas Mt.

If c>Mt in operation S228, in operation S230, from the complete channel gain table, terminal pairs having larger channel gain differences are selected as many as the number of the antennas Mt. For example, in the channel gain table of FIG. 4, the largest channel gain difference is '103.4' addressed by channels $h_2$ and $h_3$. In the channel gain table, the next largest channel gain difference is '67.5' addressed by channels $h_1$ and $h_2$.

However, because the channels $h_2$ and $h_3$ have already been selected for the largest channel gain difference, the channels $h_2$ and $h_3$ should be ruled out. Then, "13.2" addressed by channels $h_1$ and $h_{k-1}$ is found as the next largest channel gain difference. If the number of antennas Mt is, for example, 2, a terminal pair corresponding to channels $h_2$ and $h_3$ and a terminal pair corresponding to channels $h_1$ and $h_{k-1}$ may be selected.

In operation S232, a terminal having a larger channel gain difference in a selected terminal pair is selected as a reference terminal (or referred to as "Ref. User").

In operation S236, optimal power allocation for terminals in the cluster may be performed. A process of optimal power allocation will be described later in detail.

In the meantime, in operation S228, if c≤Mt (e.g., the number of the selected terminal pairs is less than the number of antennas of the BS), in operation S234, terminals having larger CQIs are selected as many as the number of Mt-c from among remaining user terminals.

As described above, according to various embodiments of the present disclosure, in the complete channel gain table, a first cluster may be set up with a terminal pair having largest channel gain difference. Such a cluster setup process may be repeatedly performed as many as the number of antennas of the transmitting end (BS). A terminal having a larger channel size from the two terminals set up for the cluster may be selected as a reference terminal and then this clustering algorithm ends. If the number of selected clusters is less than the number of antennas of the transmitting end, remaining antenna beam(s) may support a user (e.g., a terminal) having the largest channel size among terminals not set up for the clusters.

Figure 5:
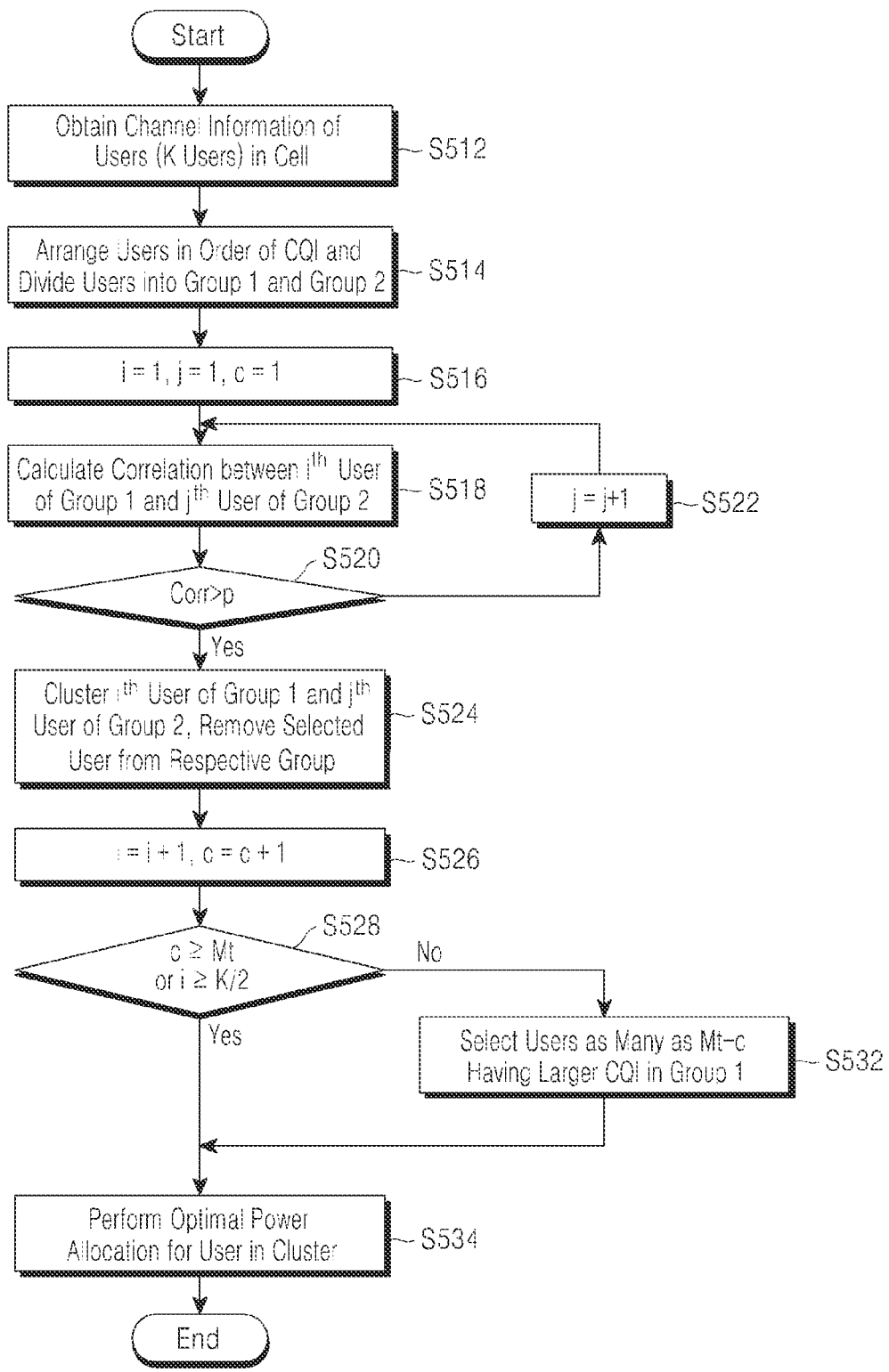
FIG. 5 is a flowchart illustrating a Channel Quality Indicator (CQI) based clustering method according to an embodiment of the present disclosure.

FIG. 5 is a flowchart illustrating a CQI based clustering method according to an embodiment of the present disclosure.

Referring to FIG. 5, the CQI based clustering method may include taking channel size difference first into account to classify terminal pairs and setting up terminal pairs having larger inter-channel correlations of terminals as clusters, thereby improving SIC performance.

In operation S512, the BS may obtain respective channel information of terminals in a cell through feedback.

In operation S514, the respective channel information obtained in operation S512 may be arranged in the order of magnitude of channel gains (or CQI). Operation S514 will now be described in detail in connection with FIG. 6.

Figure 6:
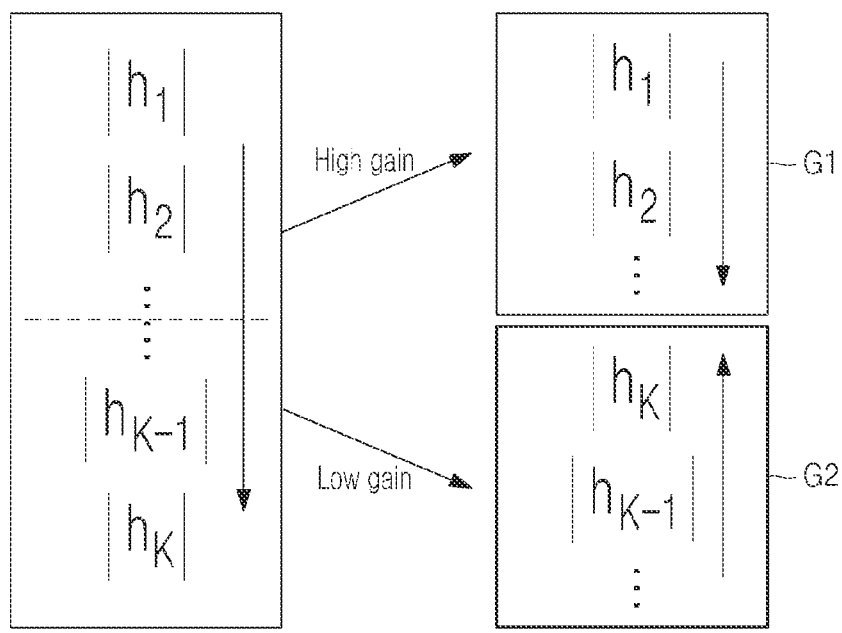
FIG. 6 illustrates a process of dividing channels arranged in order of magnitude of channel gains into two groups such as, for example, a division of channels at operation S514 of FIG. 5 according to an embodiment of the present disclosure.
Figure 7:
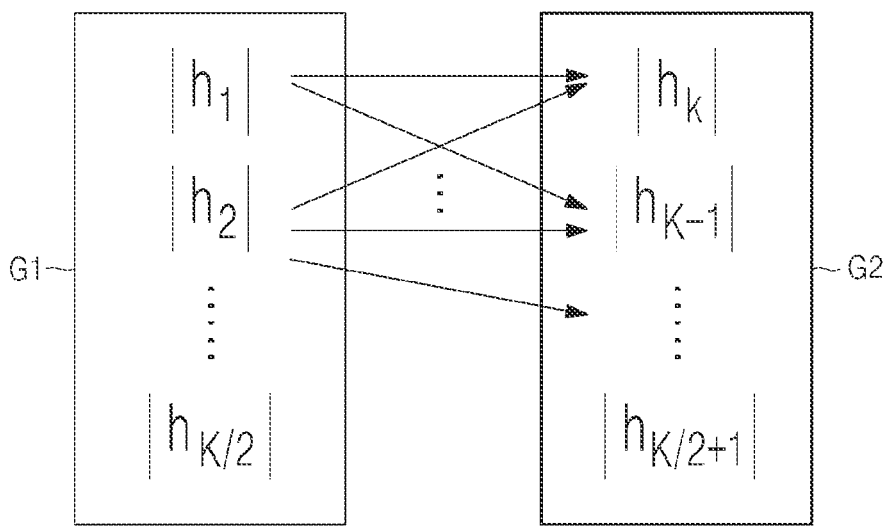
FIG. 7 illustrates a process of calculating channel correlations between two groups such as, for example, the two groups illustrated in FIG. 6 according to an embodiment of the present disclosure.

FIG. 6 illustrates a process of dividing channels arranged in order of magnitude of channel gains into two groups such as, for example, a division of channels at operation S514 of FIG. 5 according to an embodiment of the present disclosure. FIG. 7 illustrates a process of calculating channel correlations between two groups such as, for example, the two groups illustrated in FIG. 6 according to an embodiment of the present disclosure.

Referring to FIG. 6, the process of dividing channels in order of magnitude of channel gains includes dividing channels into a first group G1 with larger magnitude of channel gains and second group G2 with less magnitude of channel gains. For example, assuming that a channel having the least magnitude of channel gain in the first group G1 is $h_m$ and a channel having the largest magnitude of channel gain in the second group G2 is $h_{m+1}$, the magnitude of channel gain $|h_{K/2}|$ of $h_m$ is greater than the magnitude of channel gain $|h_{K/2+1}|$ of $h_{m+1}$. As such, once divided into the first and second groups G1 and G2, the terminals may be arranged again in the respective groups in order of magnitude of channel gains. Specifically, the first group G1 adopts arrangement of decreasing order while the second group G2 adopts arrangement of increasing order. Then, as shown in FIG. 7, calculation of correlation begins with a first channel $h_1$ of the first group G1 and a first channel $h_K$ of the second group G2.

Turning back to FIG. 5, in operation S516, a first ($i^{th}$) channel $h_1$ of the first group G1 and a first ($j^{th}$) channel hK of the second group G2 may be selected, and in operation S518, a correlation Corr between the first ($i^{th}$) channel $h_1$ of the first group G1 and the first ($j^{th}$) channel $h_K$ of the second group G2 may be calculated. The correlation Corr may be calculated as in Equation 2.

$$\text{Corr} = \frac{|h_1 \cdot h_K|}{|h_1||h_K|} \quad \text{Equation (2)}$$

In operation S520, the correlation Corr calculated by equation 2 may be compared with the correlation threshold ρ.

In operation S524, if it is determined in operation S520 that Corr>ρ, the $i^{th}$ channel $h_1$ of the first group G1 and the $j^{th}$ channel $h_K$ of the second group G2 may be clustered in a cluster, and then the $i^{th}$ channel $h_1$ and the $j^{th}$ channel $h_K$ may be removed from the first and second groups G1 and G2, respectively.

With operations S522 and S526, a series of operations S516 to S524 may be repeatedly performed for all the channels in the first group G1, and in operation S528 if the number of established clusters c is the same as the number of antennas of the transmitting end (or the BS) (e.g., c≥Mt or i≥K/2), the CQI based clustering procedure may end.

Otherwise, in operation S528 if as many clusters as the number of antennas of the transmitting end (or the BS) have not been set up (e.g., c<Mt), in operation S532, as many channels having larger CQI (channel gains) as Mt-c may be selected from among remaining channels not removed from the first group G1 and Orthogonal Multiple Access (OMA) beamforming may be applied to terminals using the selected channels. In other words, if the number of selected clusters is less than the number of antennas of the transmitting end, remaining antenna beam(s) may support a terminal having the largest channel size among terminals not set up for the clusters. In this regard, a reference terminal for forming a beamforming vector of the cluster may be selected to be a terminal that uses a channel of the first group, Group 1.

Upon completion of the clustering algorithm, in operation S534, optimal power allocation process may be performed for terminals in each cluster.

As mentioned above, various embodiments of the present disclosure improve user capacity in relation to the existing OMA beamforming system while maximizing a sum capacity of users in a cluster. Accordingly, power allocation may be optimized, which may be expressed in Equation 3.

$$\alpha_i = \underset{\alpha}{\text{argmax}}(R_1 + R_2) \quad \text{Equation (3)}$$

s.t.

$$R_2 \geq \frac{1}{2} R_{2,OMA}$$

where $R_1$ represents a communication capacity of the reference terminal near the BS, and $R_2$ represents a communication capacity of an edge user terminal far from the BS. The reference terminal refers to a terminal that plays a reference to form a beamforming vector of the cluster, and the edge user terminal refers to a terminal having a smaller channel size in the cluster. $\alpha_i$ indicates power to be allocated to the reference terminal of an $i^{th}$ cluster. Power allocated to the edge user terminal is $1-\alpha_i$.

$\alpha_i$ may obtain its solution from the Karush-Kuhn-Tucker (KKT) conditions. The solution obtained from the KKT conditions may be expressed as in Equation 4.

$$\alpha_i^* = \frac{|h_{i,2}w_i|^2\beta - \left\{\sqrt{(1+|h_{i,2}w_{2,OMA}|^2\beta)} - 1\right\}\left\{\sum_{i=1,i\neq 1}^{M_i}|h_{i,2}w_i|^2\beta + 1\right\}}{|h_{i,2}w_i|^2\beta\sqrt{(1+|h_{i,2}w_{2,OMA}|^2\beta)}}, 0 \leq \alpha_i^* \leq 1 \quad \text{Equation (4)}$$

where, $w_i$ indicates a beamforming vector for the $i^{th}$ cluster, $h_{i,2}$ indicates a channel of the edge user terminal of the $i^{th}$ cluster, and $w_{2,OMA}$ indicates a beamforming vector for the edge user terminal if OMA is applied. β represents a transmission power to noise power ratio, $$\frac{\text{transmitted power}}{\text{noise power}}.$$

From equation 4, a ratio of power $\alpha_i^*$ allocated to the first terminal of the $i^{th}$ cluster is closely related to $h_{i,2}$ and β as in Equation 5.

$$\alpha_i^* \propto \frac{1}{h_{i,2}} \text{ and } \frac{1}{\beta} \quad \text{Equation (5)}$$

In accordance with Equation 5, the ratio of power $\alpha_i^*$ allocated to the first terminal of the $i^{th}$ cluster is in inverse proportion to a channel gain $|h_{i,2}|$ or SNR (β) of the edge user terminal in the $i^{th}$ cluster, regardless of its own channel gain $|h_{i,2}|$. For example, $\alpha_i^*$ increases as the channel gain $|h_{i,2}|$ or SNR (β) decreases. To satisfy this, constraints of the edge user terminal of the $i^{th}$ cluster is reduced, leading to decrease in power for a second terminal and increase in power for the first terminal. In other words, when NOMA is applied, because a sum capacity of the communication capacities of the first and second terminals within the cluster is likely to be higher as the channel gain $|h_{i,2}|$ of the second terminal (e.g., edge user terminal) decreases, optimized power allocation may be possible.

In order for the solution obtained in equation 4 to be applied, conditions of the following equation 6 should be met. In other words, Equation 6 is a condition for applying the NOMA scheme to a beamforming system.

$$\varepsilon > 0 \text{ where } \varepsilon = |h_{i,2}w_i|^2\beta - \left\{\sqrt{(1+|h_{i,2}w_{2,OMA}|^2\beta)} - 1\right\} \left\{\sum_{i=1,i\neq 1}^{Mi} |h_{i,2}w_i|^2\beta + 1\right\} \quad \text{Equation (6)}$$

Operating procedures of a transmitting end (hereinafter, referred to as a BS) and a receiving end (referred to as a terminal) each having a beamforming system (e.g., a NOMA beamforming system) to which a NOMA scheme is applied will now be described in detail, in accordance with an embodiment of the present disclosure.

Figure 8:
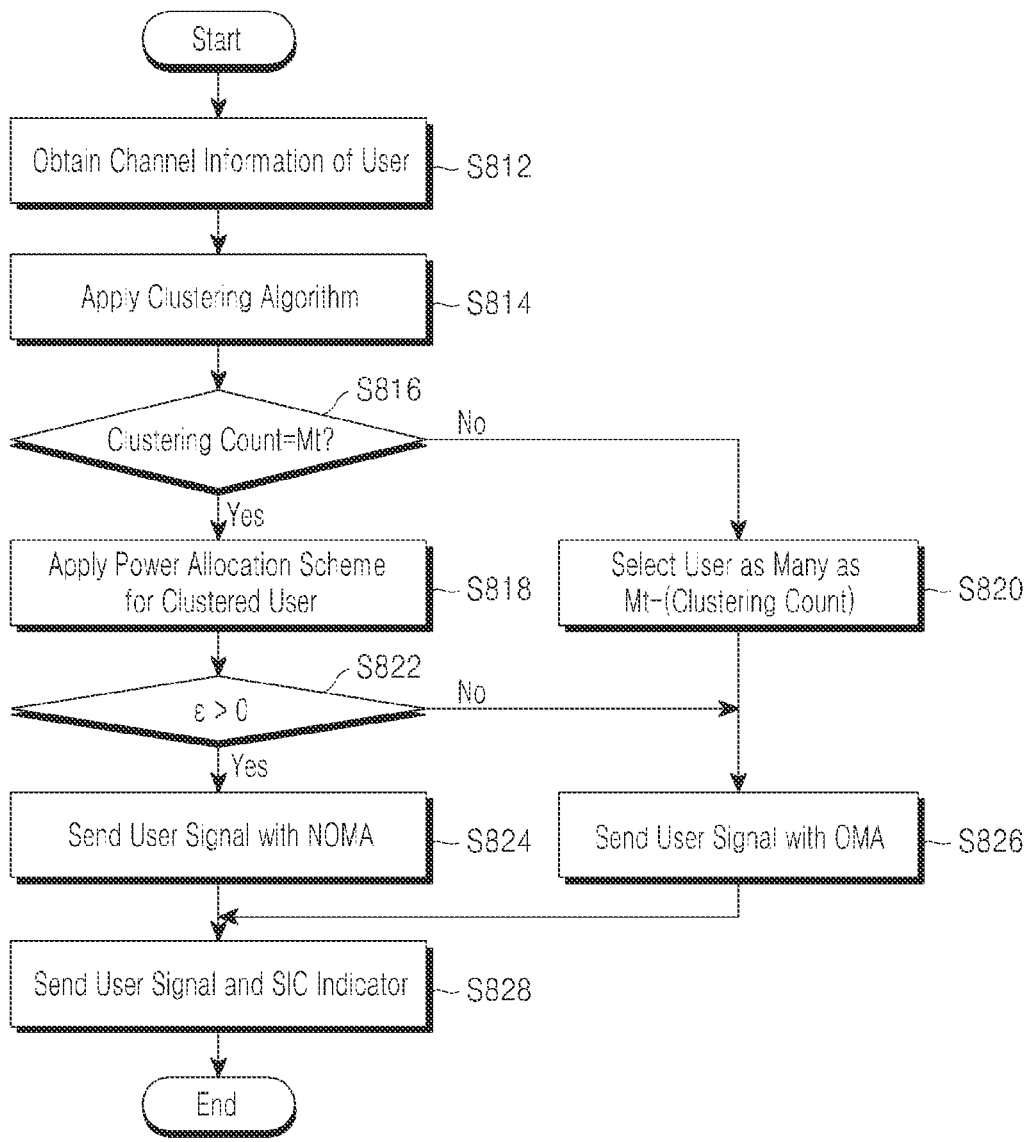
FIG. 8 is a flowchart illustrating an operating procedure of a base station having a Non-Orthogonal Multiple Access (NOMA) beamforming system according to an embodiment of the present disclosure according to an embodiment of the present disclosure.

FIG. 8 is a flowchart illustrating an operating procedure of a BS having a NOMA beamforming system according to an embodiment of the present disclosure.

Referring to FIG. 8, in operation S812, the BS may obtain respective channel information from terminals through feedback. The respective channel information may include a channel gain (or CQI) and a channel phase.

In operation 814, the terminals may be clustered according to a clustering method as proposed according to various embodiments of the present disclosure. The clustering method was fully described with reference to FIGS. 2 to 7, the detailed description of which will be omitted herein.

In operation S816, the number of clusters c resulting from operation S814 may be compared with the number of antennas Mt of the BS.

If it is determined that c≥Mt in operation S816, in operation S818, a power allocation scheme in accordance with equations 3 to 5 may be applied to the clustered terminals.

In operation S822, if the conditions of equation 5 is met (e.g., ε>0), in operation 824 the BS may transmit user signals to the terminals in accordance with the NOMA scheme and in operation 828 the BS sends user signals and SIC indicators to the terminals.

In contrast, if it is determined that $_c$≥Mt in operation S816, in operation S820 as many terminals as Mt-$_c$ may be selected and in operation 826 the BS transmits user signals to the selected terminals in accordance with an OMA beamforming scheme.

In operation 822, if ε<0, the BS transmits user signals to the terminals in accordance with the OMA scheme in operation S826 and sends user signals and SIC indicators to the terminals in operation S828.

Figure 9:
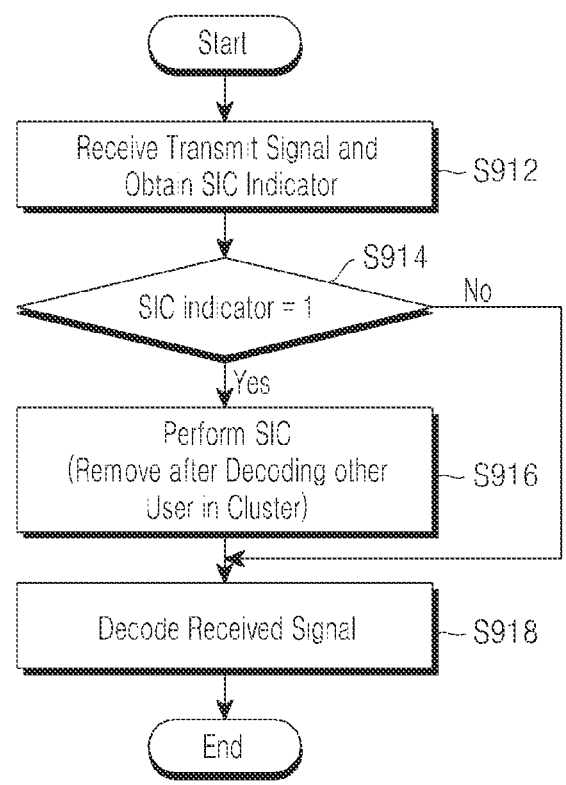
FIG. 9 is a flowchart illustrating an operating procedure of a terminal having a NOMA beamforming system according to an embodiment of the present disclosure according to an embodiment of the present disclosure.

FIG. 9 is a flowchart illustrating an operating procedure of a terminal having a NOMA beamforming system according to an embodiment of the present disclosure.

Referring to FIG. 9, in operation S912, the terminal may receive an SIC indicator from the BS. The SIC indicator corresponds to information indicating a terminal to perform SIC when NOMA is applied. Because various embodiments of the present disclosure adopt OMA and NOMA in combination, the BS may send the SIC indicator to a first terminal within the cluster when NOMA is applied. The SIC indicator may be sent in a simple 1-bit form on a control channel. For example, when NOMA is applied, the BS may send a terminal to perform SIC a logic high (1) signal of one bit while sending a terminal not to perform SIC a logic low (0) signal of one bit. Because terminals do not perform SIC when OMA is applied, the BS may send the terminals a logic low (0) signal of one bit.

In operation S914, the terminal may determine whether a logic value of the SIC indicator is '1'.

If it is determined that the logic value is '1' in operation S914, in operation S916 the terminal may perform SIC. In this regard, the terminal performs SIC after decoding user signal(s) of other terminal(s) in the same cluster. Then, in operation S918, the terminal may decode the received user signal.

If it is determined in operation S914 that the logic value is '0', in operation S918 the terminal may decode the user signal without performing SIC.

As discussed above, by clustering (or classifying) multi users that constitute a receiving end based on the correlation based algorithm or CQI based algorithm in accordance with various embodiments of the present disclosure and applying the power allocation scheme in accordance with various embodiments of the present disclosure to the clustered multi users, performance degradation that may occur in a NOMA beamforming system may be reduced.

According to various embodiments of the present disclosure, a clustering scheme for a case in which the number of terminals per cluster is more than N will now be described in detail.

A CQI based clustering scheme for the case in which the number of terminals per cluster is more than N will be discussed first.

Figure 10:
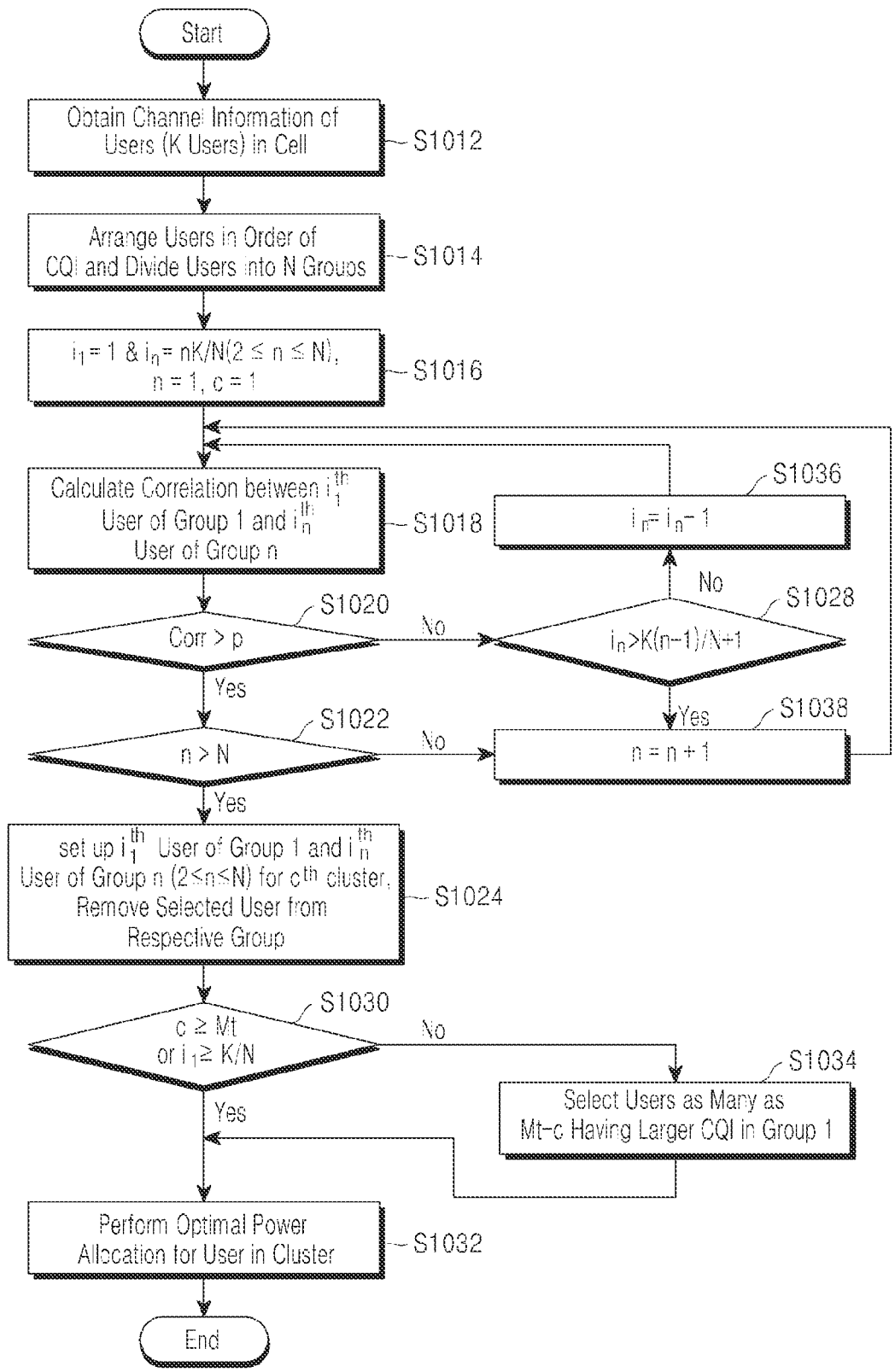
FIG. 10 is a flowchart illustrating a CQI based clustering method according to an embodiment of the present disclosure.

FIG. 10 is a flowchart illustrating a CQI based clustering method, according to an embodiment of the present disclosure.

Referring to FIG. 10, in operation S1012, the BS may obtain respective channel information from K terminals in a cell through feedback.

In operation S1014, the BS may arrange channel gains of terminals in order of the magnitude based on the obtained channel information. Further description of this will be described with reference to FIGS. 11 and 12.

Figure 11:
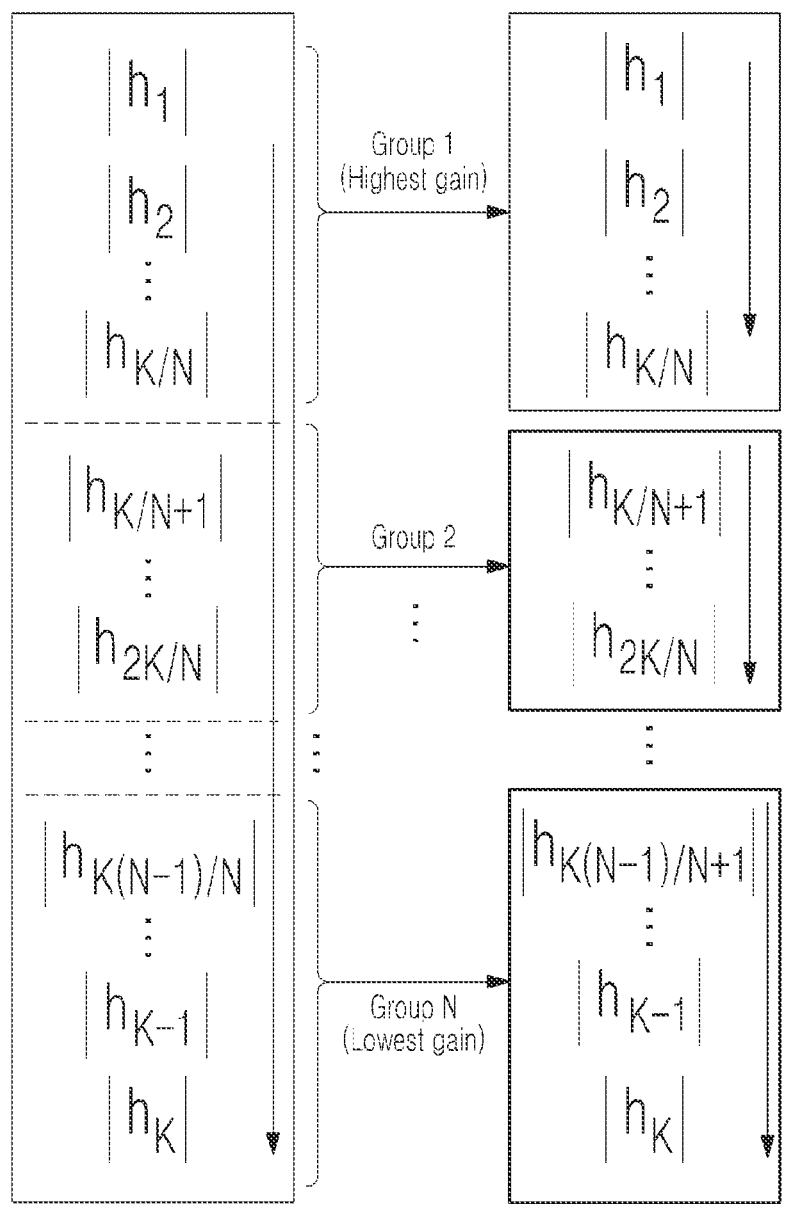
FIG. 11 illustrates a process of dividing channels arranged in order of magnitude of channel gains into N groups such as, for example, the division of channels at operation S1014 of FIG. 10 according to an embodiment of the present disclosure.
Figure 12:
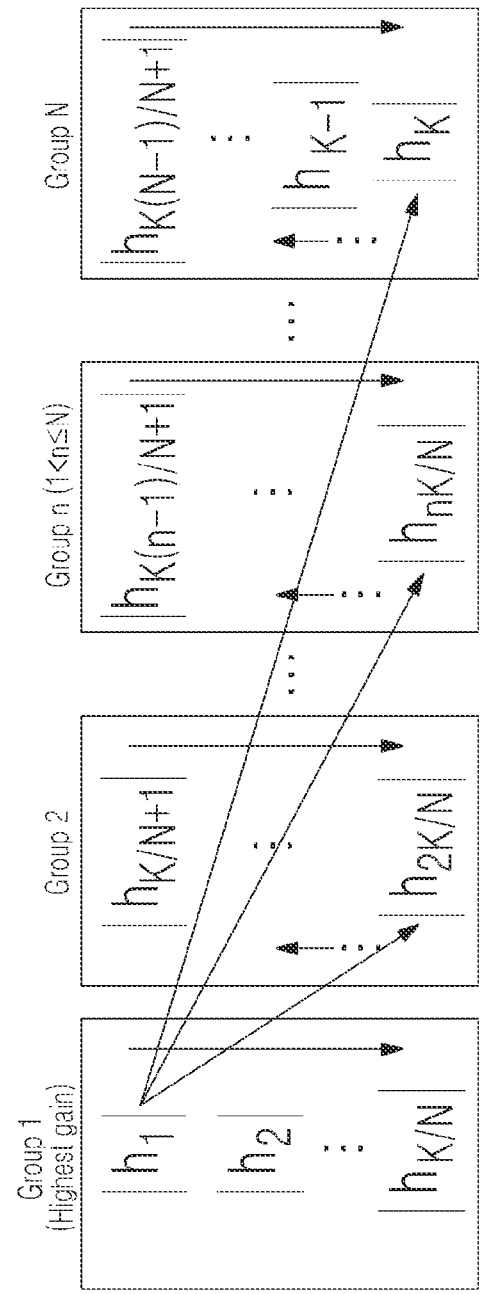
FIG. 12 illustrates a process of calculating channel correlations among N groups such as, for example, the calculating of channel correlations shown in FIG. 11 according to an embodiment of the present disclosure.

FIG. 11 illustrates a process of dividing channels arranged in order of magnitude of channel gains into N groups such as, for example, the division of channels at operation S1014 of FIG. 10 according to an embodiment of the present disclosure. FIG. 12 illustrates a process of calculating channel correlations among N groups such as, for example, the calculating of channel correlations shown in FIG. 11 according to an embodiment of the present disclosure.

Referring to FIG. 11, as shown in the left of FIG. 11, channel gains are ordered in decreasing order of the magnitude, and as shown in the right of FIG. 11, the channel gains ordered in the decreasing order of the magnitude are divided into first to $N^{th}$ groups, Group 1, Group 2, . . . , Group N. The first group, Group 1 includes relatively higher channel gains and the $N^{th}$ group, Group N includes relatively lower channel gains.

In operation S1016, a first highest channel gain $|h1|(i_1=1)$ is selected in the first group, Group 1, and a lowest channel gain $i_n$=nK/N, (2≤n≤N) is selected in the nth group, Group n (2≤n≤N).

In operation S1018, a correlation Corr between the first highest channel gain $|h1|(i_1=1)$ in the first group, Group 1 and the lowest channel gain $i_n$=nK/N, (2≤n≤N) in the nth group, Group n (2≤n≤N) is calculated. Calculation of the correlation may be expressed as in Equation 7.

$$\text{Corr} = \frac{|h_1 \cdot h_{nK/N}|}{|h_1||h_{nK/N}|} \qquad \text{Equation (7)}$$

In operation S1020, the calculated correlation Corr is compared with the correlation threshold ρ.

If Corr>ρ in operation S1020a terminal that uses channel $h_1$ and a terminal that uses channel hnk/N forms a cluster.

If Corr<ρ in operation S1020, a next lowest channel gain $|h_{n-1K/N}|$ is selected in the $n^{th}$ group, Group n, and involved in calculation of correlation as expressed in equation 7. Similarly, with operations S1028 and S1036, operations S1018 and S1020 may be repeatedly performed for all channel gains in the $n^{th}$ group.

In operation S1022, it is determined whether operations S1018 and S1020 have been complete for the channel gain $|h_1|$ in the first group, Group 1 and all the channel gains in the $n^{th}$ group, Group n (2≤n≤N), and if the operations have not been complete in operation S1022, then with operations S1038, S1028, and S1036, operations S1018, S1020, and S1022 may be repeatedly performed. In contrast, if the operations have been complete, in operation S1024 terminals meeting the condition of operation S1020 may be selected and form a cluster. The selected terminals may be removed from the corresponding group.

In operation S1030, the number of established clusters c may be compared with the number of antennas Mt of the BS. If c≥Mt in operation S1030, in operation S1032, power allocation is performed for terminals in each cluster in accordance with Equations 3 to 6. If c<Mt in operation S1030, in operation S1034, as many terminals as Mt-c may be selected in order of magnitude of channel gains from among remaining terminals exclusive of the terminals constituting clusters in the first group, Group 1. An OMA scheme may be applied for the selected terminals.

Figure 13A:
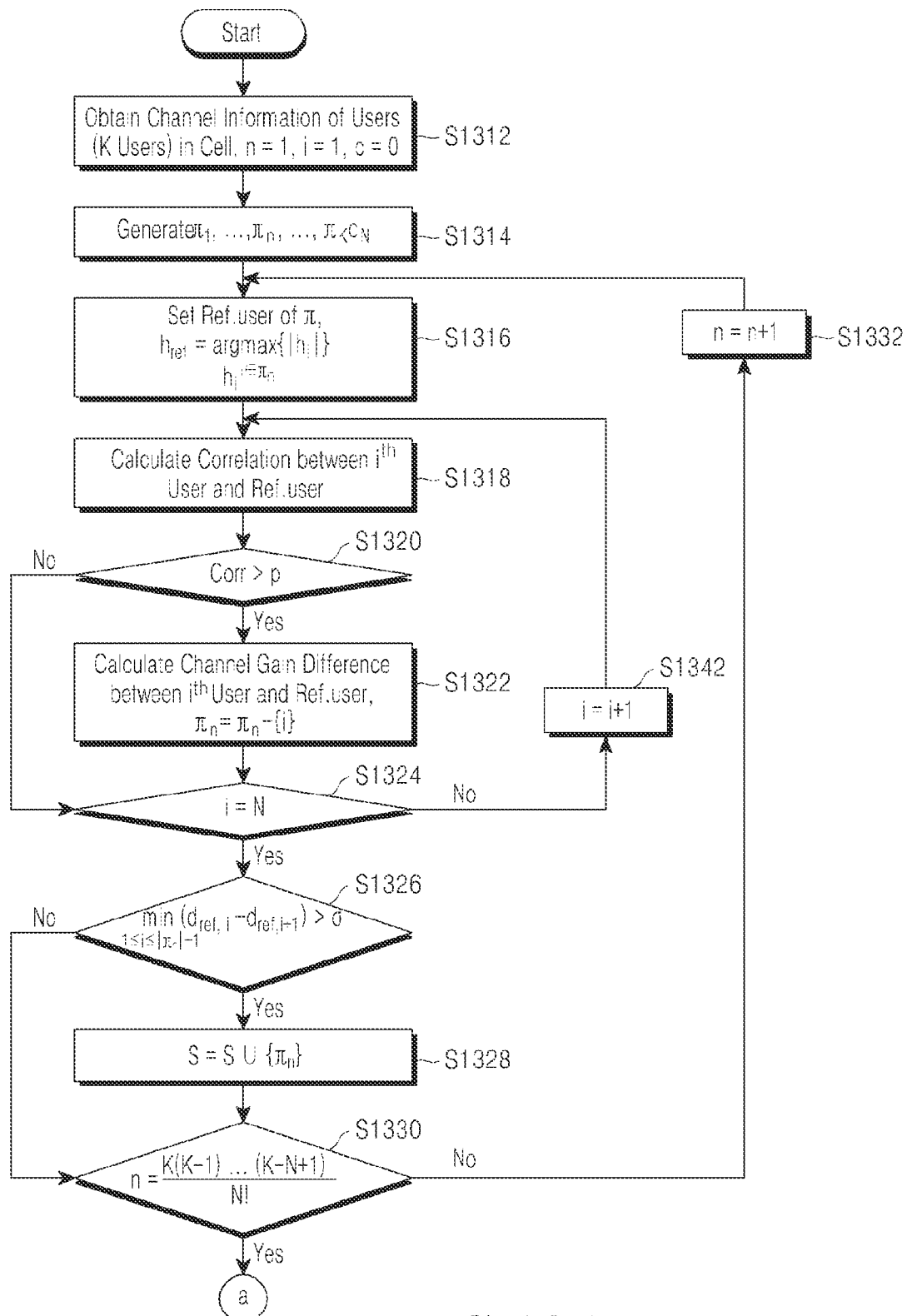
FIGS. 13A and 13B are a flowchart illustrating a correlation based clustering method according to an embodiment of the present disclosure.
Figure 13B:
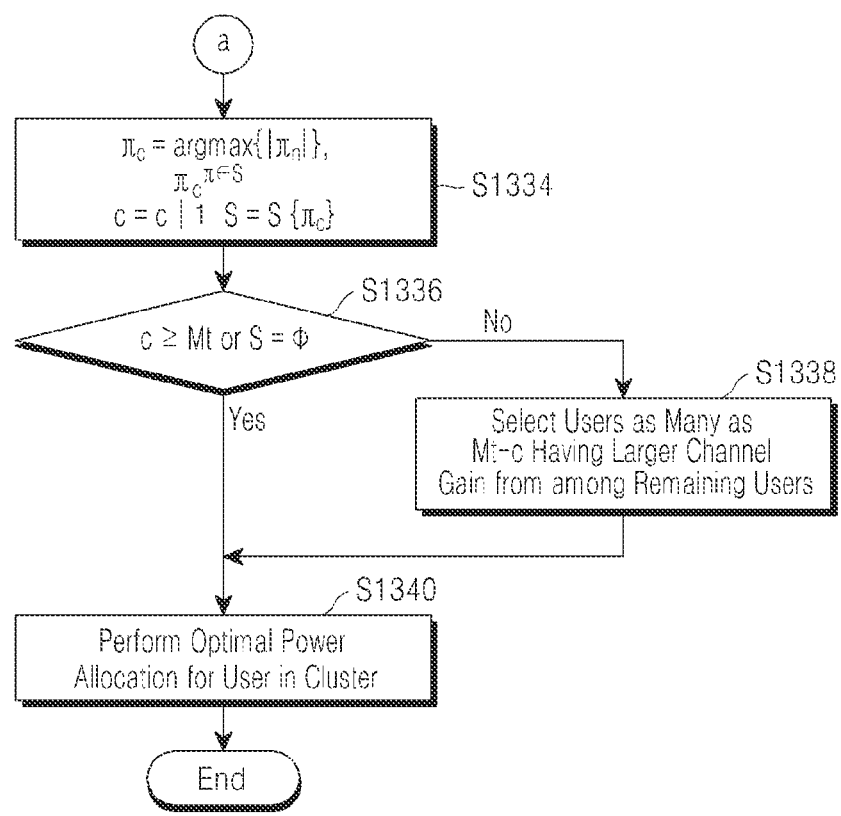

FIGS. 13A and 13B are a flowchart illustrating a correlation based clustering method, according to an embodiment of the present disclosure.

Referring to FIGS. 13A and 13B, in operation 1312, the BS may obtain respective channel information from K terminals in a cell.

In operation S1314, a set of all the cases (Πn, $1 \le n \le {_K}C_N$) where N of K terminals are grouped (or selected) together may be checked. ${_K}C_N$ may be expressed as:

$$\frac{K(K-1) \ldots (K-N+1)}{N!}.$$

In operation S1316, a channel of a terminal having the largest channel gain among the group of N terminals may be set as a reference channel, which may be expressed in Equation 8.

$$h_{ref} = \underset{h_i}{\operatorname{argmax}}\{|h|\} \text{ for } 1 \le n \le \frac{K(K-1) \ldots (K-N+1)}{N!} \qquad \text{Equation (8)}$$

where n represents an index of the set Π, and i represents an index of a terminal in the set Π.

In operation S1318, a correlation Corr between the reference channel in the set Π and another channel in the same set Π may be calculated. This may be expressed as in Equation 9.

$$\text{Corr} = \frac{|h_{ref} \cdot h_i|}{|h_{ref}||h_i|} \qquad \text{Equation (9)}$$

where, i∈Πn.

In operation S1320, a correlation test for comparing the Corr and the correlation threshold ρ may be performed.

If Corr≤ρ in operation S1320, the method proceeds to operation S1324.

If Corr>ρ in operation S1320, in operation S1322, a channel gain difference $d_{ref,i}$ between the corresponding reference channel and an $i^{th}$ channel may be calculated. This may be expressed as in Equation 10.

$$d_{ref,i} = |h_{ref}| - |h_i| \qquad \text{Equation (10)}$$

A terminal that fails the correlation test may be left out from the set $\Pi_n$.

In operation 1324, it is determined whether the correlation Corr between the reference channel in the set Π and all channel in the same set Π has been calculated and compared with the correlation threshold ρ for all channels in the same set Π. If the correlation Corr between the reference channel in the set Π and all channel in the same set Π has been calculated and compared with the correlation threshold ρ has not been performed for all channels in the same set Π, then with operation S1342, operations S1318, S1320, S1322, and S1324 may be repeated.

In the previous embodiment of the present disclosure that assumes two terminals per cluster, one channel gain difference is generated per cluster. However, in this embodiment of the present disclosure, the number of terminals per cluster may be extended to more than three and thus two or more channel gain differences may be calculated. In this case, a criterion for establishing a final cluster may be required. For this, in operation S1326, a minimum channel gain difference among channel gain differences calculated in the set Π may be compared with a predetermined threshold σ. This may be expressed as in Equation 11.

$$\min_{1 \le i \le |\pi_n|-1} (d_{ref,i} - d_{ref,i+1}) > \sigma \qquad \text{Equation (11)}$$

The reason for which the minimum channel gain difference among channel gain differences between two channel gains selected in the set Π is compared with the predetermined threshold σ is that so long as the minimum channel gain difference is greater than the predetermined threshold σ, the rest of channel gain differences calculated in the set $\Pi_n$ may be greater than the predetermined threshold σ. In other words, there is no need to determine whether all the rest of channel gain differences are greater than the predetermined threshold σ, thus reducing the burden of computation.

The reason for determining whether channel gain differences between two channel gains selected in the set $\Pi_n$ are greater than the predetermined threshold σ, is that SIC may be performed when there is somewhat greater difference of channel gain.

In operation S1328, a set having a minimum channel gain difference greater than the predetermined threshold σ may be established as a set S. This may be expressed as in Equation 12.

$$S = S \cup \left\{ \pi_n \,\middle|\, \min_{1 \le i \le |\pi_n|-1} (d_{ref,i} - d_{ref,i+1}) > \sigma \right\} \qquad \text{Equation (12)}$$

If the condition of operation S1326 is not met, the method goes to operation 1330 where it is determined whether the comparison process of operation S1326 has been complete for all sets. If the comparison process has not been complete for all sets, in operation S1332, a next set $\Pi_{n+1}$ may be selected and operations S1316 to S1328 may be repeatedly performed for the next set $\Pi_{n+1}$.

In operation S1334, all the sets that meet the conditions of equation 9 to 12 may be established as sets $\Pi_C$s. The set $\Pi_C$ may be expressed as in Equation 13.

$$\pi_c = \underset{\pi_n}{\mathrm{argmax}}\{|\pi_n|\}, \quad \pi_n \in S$$
$$c = c+1, S = S - \{\pi_c\}$$

Equation (13)

In operation S1336, the established sets $\Pi_C$s may be arranged in order of size of the sets $\Pi_C$s, as many sets $\Pi_C$s as the number of antennas are selected in order of the size, and in operation S1338, the selected sets $\Pi_C$s form clusters. The term 'size of the sets $\Pi C$' refers to the number of elements contained in the set $\Pi C$. Once as many clusters as the number of antennas are formed in operation S1336, in operation S1340, optimum power may be allocated to terminals within the clusters according to the aforementioned power allocation scheme.

If the number of clusters c is less than the number of antennas in operation S1336, as many terminals as Mt-c may be selected from among remaining terminals exclusive of the terminals included in the clusters, in decreasing order of channel gains of the terminals, and user signals are sent to the selected terminals based on an OMA scheme. In operation S1340, power allocation is performed for terminals in each cluster.

Figure 14:
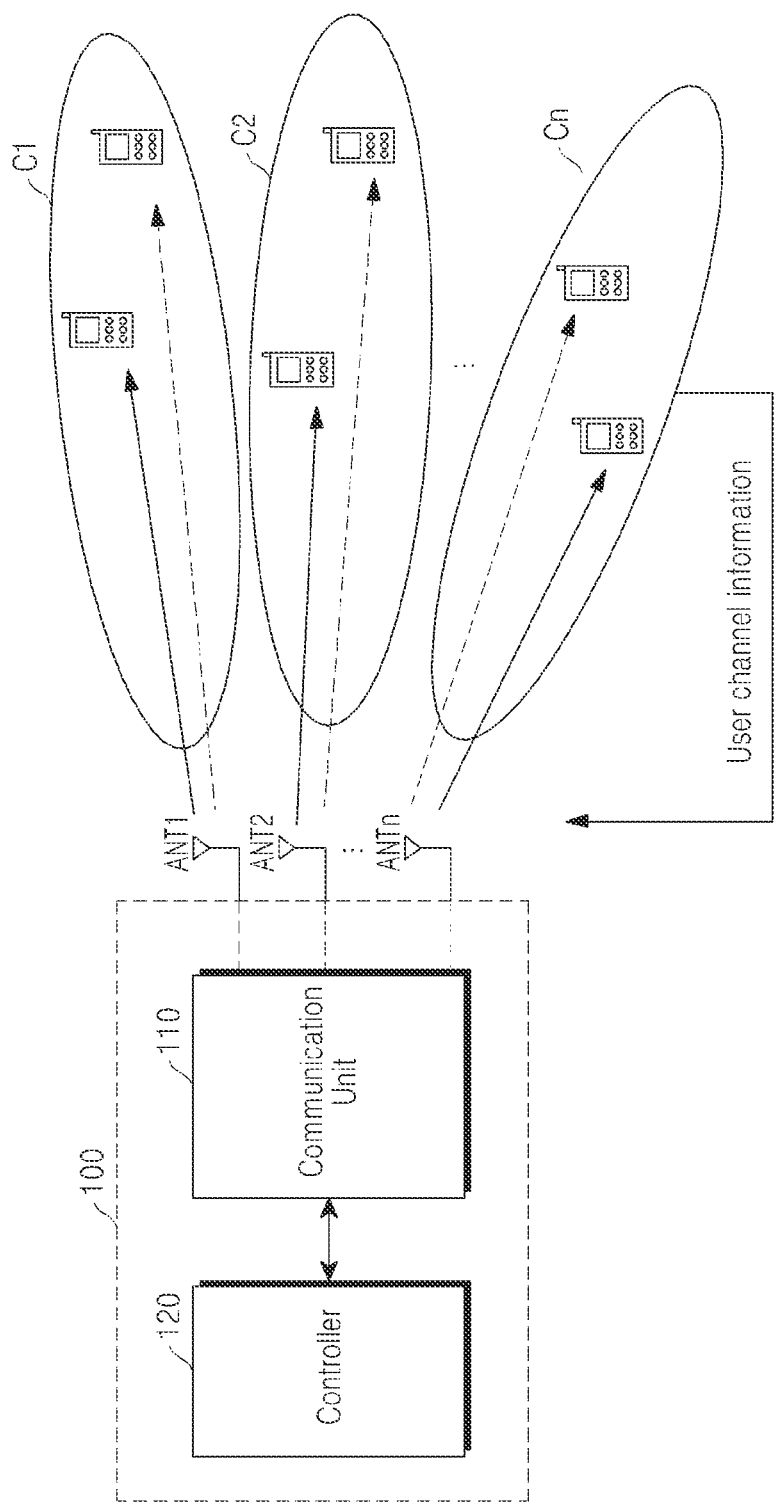
FIG. 14 is a schematic block diagram of a transmitter device according to an embodiment of the present disclosure.

FIG. 14 is a schematic block diagram of a transmitter device, according to an embodiment of the present disclosure.

Referring to FIG. 14, the transmitter device 100 may be a BS that communicates with multiple clusters C1, C2, . . . , Cn through multiple antennas ANT1, ANT2, . . . , ANTn (where n is a natural number). The number of the multiple clusters C1, C2, . . . , Cn are the same as the number of the multiple antennas ANT1, ANT2, . . . , ANT included in the transmitter device 100. The clusters C1, C2, . . . , Cn may have the same number of receiver devices according to the aforementioned clustering scheme.

The transmitter device 100 may include a communication unit 110 and a controller 120.

The communication unit 110 may receive respective channel information from the multiple receiver devices within the clusters and convert the channel information to processable information. The processable information may be forwarded to the controller 120.

The controller 120 may perform operations for generating a power allocation ratio and beamforming vector among receiver devices within the cluster based on the channel information forwarded from the communication unit 110. The controller 120 may calculate channel correlations and channel gain differences among the receiver devices using the channel information. The controller 120 may also classify the multiple receiver devices into multiple clusters using the calculated channel correlations and channel gain differences and generate a beamforming vector for a cluster using a channel of a receiver device near the BS 100 in the cluster.

In accordance with the various embodiments of the present disclosure, inter-beam interference may be reduced and the number of users to be concurrently supported increases by generating as many beams as the number of antennas of a transmitting end and supporting two users per beam, thus improving communication capacity.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made without departing the scope and scope of the present disclosure as defined by the appended claims and their equivalents.

What is claimed is:

1. A method for operating a non-orthogonal multiple access (NOMA) scheme by a base station (BS) in a multiuser beamforming system, the method comprising:
receiving channel information related to channels from a plurality of terminals;
determining channel correlations representing correlations between the channels based on the channel information;
determining channel gain differences representing differences of gains for the channels based on the channel information;
classifying the plurality of terminals into a plurality of groups based on the channel correlations and the channel gain differences;
determining a beamforming vector for each of the plurality of groups based on the channel information of terminals in each of the plurality of groups;
allocating power to the terminals in each of the plurality of groups; and
forming a beam for each of the plurality of groups based on the allocated power and the determined beamforming vector.

2. The method of claim 1, wherein the classifying of the plurality of terminals into the plurality of groups comprises:
classifying the plurality of terminals into the plurality of groups so that the terminals in each of the plurality of groups have channel correlations greater than a first threshold and channel gain differences greater than a second threshold.

3. The method of claim 1, wherein the determining of the beamforming vector for each of the plurality of groups comprises:
determining the beamforming vector for each of the plurality of groups in consideration of a terminal with a largest channel gain of the terminals in each of the plurality of groups.

4. The method of claim 1, wherein the classifying of the plurality of terminals into the plurality of groups comprises:
selecting at least two terminals from among the plurality of terminals;
if the at least two terminals use channels which have channel correlations greater than a first threshold, calculating a channel gain difference of channels for the at least two terminals; and
if the channel gain difference is greater than a second threshold, grouping the at least two terminals.

5. The method of claim 1, wherein the classifying of the plurality of terminals into plurality of groups comprises:
determining whether a number of the plurality of groups is greater than a number of antennas of the BS; and
if the number of the plurality of groups is greater than the number of antennas of the BS, selecting groups as the number of antennas of the BS from the plurality of groups based on a magnitude of the channel gain differences.

6. The method of claim 1, wherein a number of the plurality of groups is equal to or less than a number of antennas of the BS.

7. The method of claim 5, wherein, if the number of the plurality of groups is less than the number of antennas of the BS, remaining antennas of the BS are used for an orthogonal multiple access (OMA) scheme.

8. The method of claim 1, wherein the power is determined based on at least one of the determined beamforming vector, a channel gain of a terminal nearest to a cell edge among the terminals in each of the plurality of groups, a transmission power to noise power ratio, and a beamforming vector for the terminal if an orthogonal multiple access (OMA) scheme is used.

9. The method of claim 1, further comprising:
transmitting, to the plurality of terminals, an indicator indicating a transmission scheme used by the BS, the transmission scheme including one of the NOMA scheme and an orthogonal multiple access (OMA) scheme.

10. A base station (BS) in a multiuser beamforming system, the BS comprising:
a communication unit configured to receive channel information related to channels from a plurality of terminals; and
a controller configured to:
determine channel correlations representing correlations between the channels based on the channel information,
determine channel gain differences representing differences of gains for the channels based on the channel information,
classify the plurality of terminals into a plurality of groups based on the channel correlations and the channel gain differences,
determine a beamforming vector for each of the plurality of groups using the channel information of terminals in each of the plurality of groups,
allocate power to the terminals in each of the plurality of groups, and
form a beam for each of the plurality of groups based on the allocated power and the determined beamforming vector.

11. The BS of claim 10, wherein the controller is further configured to:
classify the plurality of terminals into the plurality of groups so that the terminals in each of the plurality of groups have channel correlations greater than a first threshold and channel gain differences greater than a second threshold.

12. The BS of claim 10, wherein the controller is further configured to:
determine the beamforming vector for each of the plurality of groups in consideration of a terminal with a largest channel gain of the terminals in each of the plurality of groups.

13. The BS of claim 10, wherein the controller is further configured to:
select at least two terminals from among the plurality of terminals,
if the at least two terminals use channels which have channel correlations greater than a first threshold, calculate a channel gain difference of channels for the at least two terminals, and
if the channel gain difference is greater than a second threshold, group the at least two terminals.

14. The BS of claim 13, wherein the controller is further configured to:
classify the plurality of terminals into the plurality of groups,
determine whether a number of the plurality of groups is greater than a number of antennas of the BS, and
if the number of the plurality of groups is greater than the number of antennas of the BS, select groups as the number of antennas of the BS from the plurality of groups based on a magnitude of the channel gain differences.

15. The BS of claim 10, wherein a number of the plurality of groups is equal to or less than a number of antennas of the BS.

16. The BS of claim 14, wherein, if the number of the plurality of groups is less than the number of antennas of the BS, remaining antennas of the BS are used for an orthogonal multiple access (OMA) scheme.

17. The BS of claim 10, wherein the power is determined based on at least one of the determined beamforming vector, a channel gain of a terminal nearest to a cell edge among the terminals in each of the plurality of groups, a transmission power to noise power ratio, and a beamforming vector for the terminal if an orthogonal multiple access (OMA) scheme is used.

18. The BS of claim 10, wherein the communication unit is further configured to transmit, to the plurality of terminals, an indicator indicating a transmission scheme used by the BS, the transmission scheme including one of the NOMA scheme and an orthogonal multiple access (OMA) scheme.

19. A method for operating a non-orthogonal multiple access (NOMA) scheme by a terminal in a multiuser beamforming system, the method comprising:
receiving beam information from a base station (BS); and
receiving a signal from the BS based on the beam information,
wherein the beam information includes information about a beam generated by the BS by receiving channel information related to channels from a plurality of terminals, determining channel correlations representing correlations between the channels based on the channel information, determining channel gain differences representing differences of gains for the channels based on the channel information, classifying the plurality of terminals into a plurality of groups based on the channel correlations and the channel gain differences, determining a beamforming vector for each of the plurality of groups based on the channel information of terminals in each of the plurality of groups, allocating power to the terminals in each of the plurality of groups, and forming a beam for each of the plurality of groups based on the allocated power and the determined beamforming vector.

20. A terminal in a multiuser beamforming system, the terminal comprising:
a receiver; and
at least one processor configured to:
control the receiver to receive beam information from a base station (BS), and control the receiver to receive a signal from the BS based on the beam information, wherein the beam information includes information about a beam generated by the BS, by receiving channel information related to channels from a plurality of terminals, determining channel correlations representing correlations between the channels based on the channel information, determining channel gain differences representing differences of gains for the channels based on the channel information, classifying the plurality of terminals into a plurality of groups based on the channel correlations and the channel gain differences, determining a beamforming vector for each of the plurality of groups based on the channel information of terminals in each of the plurality of groups, allocating power to the terminals in each of the plurality of groups, and forming a beam for each of the plurality of groups based on the allocated power and the determined beamforming vector.

21. A non-transitory computer-readable storage medium storing instructions that, when executed cause at least one processor to perform the method of claim 1.

22. A non-transitory computer-readable storage medium storing instructions that, when executed cause at least one processor to perform the method of claim 19.

* * * * *